US006525839B1

(12) United States Patent
Beckett et al.

(10) Patent No.: US 6,525,839 B1
(45) Date of Patent: *Feb. 25, 2003

(54) ENGRAVING SYSTEM AND METHOD FOR ENGRAVING INTAGLIO AND NON-INTAGLIO PATTERNS

(75) Inventors: Tony D. Beckett, Dayton, OH (US); Kenneth William Jackson, Dayton, OH (US); David R. Seitz, Vandalia, OH (US)

(73) Assignee: MDC Max Daetwyler AG (CH)

( * ) Notice: Subject to any disclaimer, the term of this patent is extended or adjusted under 35 U.S.C. 154(b) by 0 days.

This patent is subject to a terminal disclaimer.

(21) Appl. No.: 09/285,128

(22) Filed: Apr. 2, 1999

Related U.S. Application Data

(63) Continuation of application No. 08/886,488, filed on Jul. 1, 1997, now Pat. No. 5,892,589, which is a continuation of application No. 08/376,858, filed on Jan. 23, 1995, now Pat. No. 5,675,420.

(51) Int. Cl.$^7$ ................... B41C 1/045; G06K 15/00; B23C 3/02; B23C 3/13
(52) U.S. Cl. ....................... 358/3.31; 409/131
(58) Field of Search ............... 358/1.9, 299, 3.29, 358/3.31; 409/79, 84, 131; 101/150, 170

(56) References Cited

U.S. PATENT DOCUMENTS

| 2,112,010 A | 3/1938 | Brimberg |
| 2,160,951 A | 6/1939 | Alice |

(List continued on next page.)

FOREIGN PATENT DOCUMENTS

| DE | 952266 | 11/1956 |
| EP | 0 007 125 | 1/1980 |
| EP | 0 212 487 | 3/1987 |
| EP | 0 473 973 | 8/1991 |
| EP | 0 513 559 | 11/1992 |
| EP | 0 588 283 | 3/1994 |
| JP | 01237140 | 9/1989 |
| WO | WO/95/28053 | 10/1995 |

OTHER PUBLICATIONS

Digital Image Processing, Pratt, Second Edition, John Wiley and Sons, Section 14.5, 1991.
The Gravure Engraving Manual, The Gravuer Association of America, 1987.
"Latest News from Engraving Maschine Manufacturers", presentation by Bruck–Service Goerz, Christian Stover, ERA Packaging Division Meeting, Sep. 18 & 19, 1996.
"Laserstream Update", Think Laboratory Japan, Gravure Cylinder Manufacture, Mar. 1995, Cooper and Turner Pty. Limited, Unit 1, 55–65 Grandview Street, Pymble NSW 2073, Australia.
Think Boomerang System, Technical Information, Think Laboratory Co., Ltd., 610–1 Umebayashu, Toyofuta Kashiwa-shu, Chiba, Japan, undated.
Think Boomerang System, "Rotogravure Cylinder Making System", undated publication.

*Primary Examiner*—Scott Rogers
(74) *Attorney, Agent, or Firm*—Jacox Meckstroth & Jenkins

(57) ABSTRACT

An engraving method and apparatus for engraving a cylinder for printing an intaglio pattern and/or non-intaglio pattern on a web of material. The engraver includes a driver for rotatably driving the cylinder and a computer for controlling the operation of the engraver and for generating an intaglio engraving signal corresponding to an intaglio pattern and a non-intaglio signal for a gravure pattern. The engraver also uses an engraving head for engraving the cylinder with the intaglio pattern and the gravure pattern during the rotation of the cylinder in response to the intaglio engraving signal and non-intaglio signal. The invention includes an intaglio engraved pattern and method for engraving engraved areas having bottoms which are generally planar.

20 Claims, 18 Drawing Sheets

U.S. PATENT DOCUMENTS

| | | | |
|---|---|---|---|
| 2,164,209 | A | 6/1939 | Howey et al. |
| 2,441,651 | A | 5/1948 | Thompson |
| RE23,914 | E | 12/1954 | Boyajean |
| 2,880,270 | A * | 3/1959 | Hell .......................... 358/3.29 |
| 2,881,246 | A | 4/1959 | Fairchild |
| 2,925,464 | A | 2/1960 | Raible |
| 3,093,071 | A * | 6/1963 | Taylor ........................ 101/150 |
| 3,612,753 | A | 10/1971 | Korman |
| 3,636,251 | A | 1/1972 | Daly et al. |
| 3,652,992 | A | 3/1972 | Koll |
| 3,694,570 | A | 9/1972 | Kotov et al. |
| 3,769,455 | A | 10/1973 | de Vos et al. |
| 3,770,888 | A | 11/1973 | de Vos et al. |
| 3,784,739 | A | 1/1974 | de Vos et al. |
| 3,876,829 | A | 4/1975 | Schreiber |
| 3,904,816 | A | 9/1975 | Taudt et al. |
| 3,956,583 | A | 5/1976 | Pugsley |
| 3,964,382 | A | 6/1976 | Baar et al. |
| 4,003,311 | A | 1/1977 | Bardin |
| 4,052,739 | A | 10/1977 | Wada et al. |
| 4,174,527 | A | 11/1979 | Schaefer |
| 4,287,537 | A | 9/1981 | Pfau et al. |
| 4,301,583 | A | 11/1981 | Poole |
| 4,357,633 | A | 11/1982 | Buechler |
| 4,394,693 | A | 7/1983 | Shirley |
| 4,450,486 | A | 5/1984 | Buechler |
| 4,451,856 | A | 5/1984 | Buechler |
| 4,484,232 | A | 11/1984 | Gast |
| 4,500,929 | A | 2/1985 | Buechler |
| 4,503,468 | A | 3/1985 | Serinken et al. |
| 4,612,584 | A | 9/1986 | George et al. |
| 4,688,101 | A | 8/1987 | Doelves et al. |
| 4,805,312 | A | 2/1989 | Datwyler |
| 4,830,552 | A | 5/1989 | Ryf |
| 5,229,861 | A | 7/1993 | Nozaka et al. |
| 5,293,426 | A | 3/1994 | Wouch et al. |
| 5,424,845 | A | 6/1995 | Holowko et al. |
| 5,438,422 | A | 8/1995 | Holowko et al. |
| 5,481,366 | A | 1/1996 | Sakamoto |
| 5,675,420 | A * | 10/1997 | Beckett et al. .............. 358/299 |
| 5,892,589 | A * | 4/1999 | Beckett et al. .............. 358/299 |

* cited by examiner

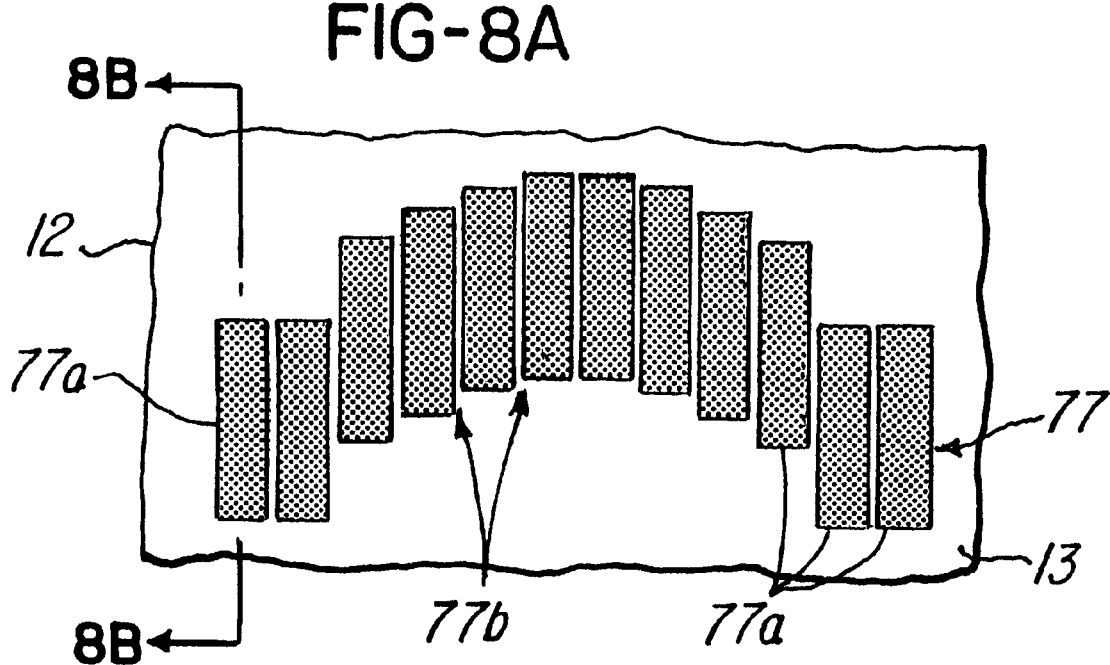
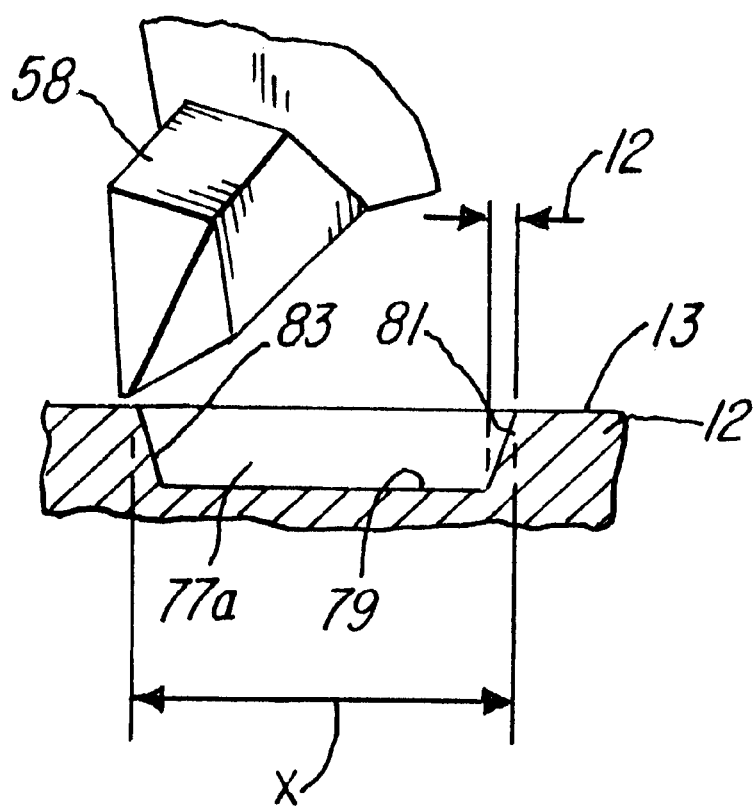

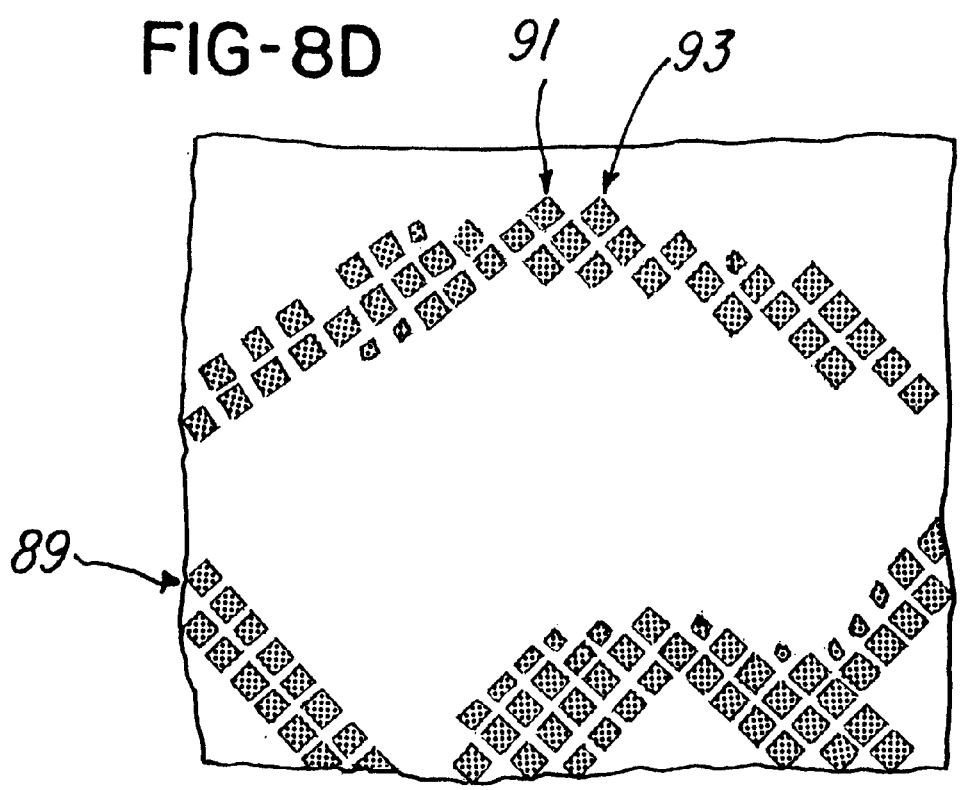

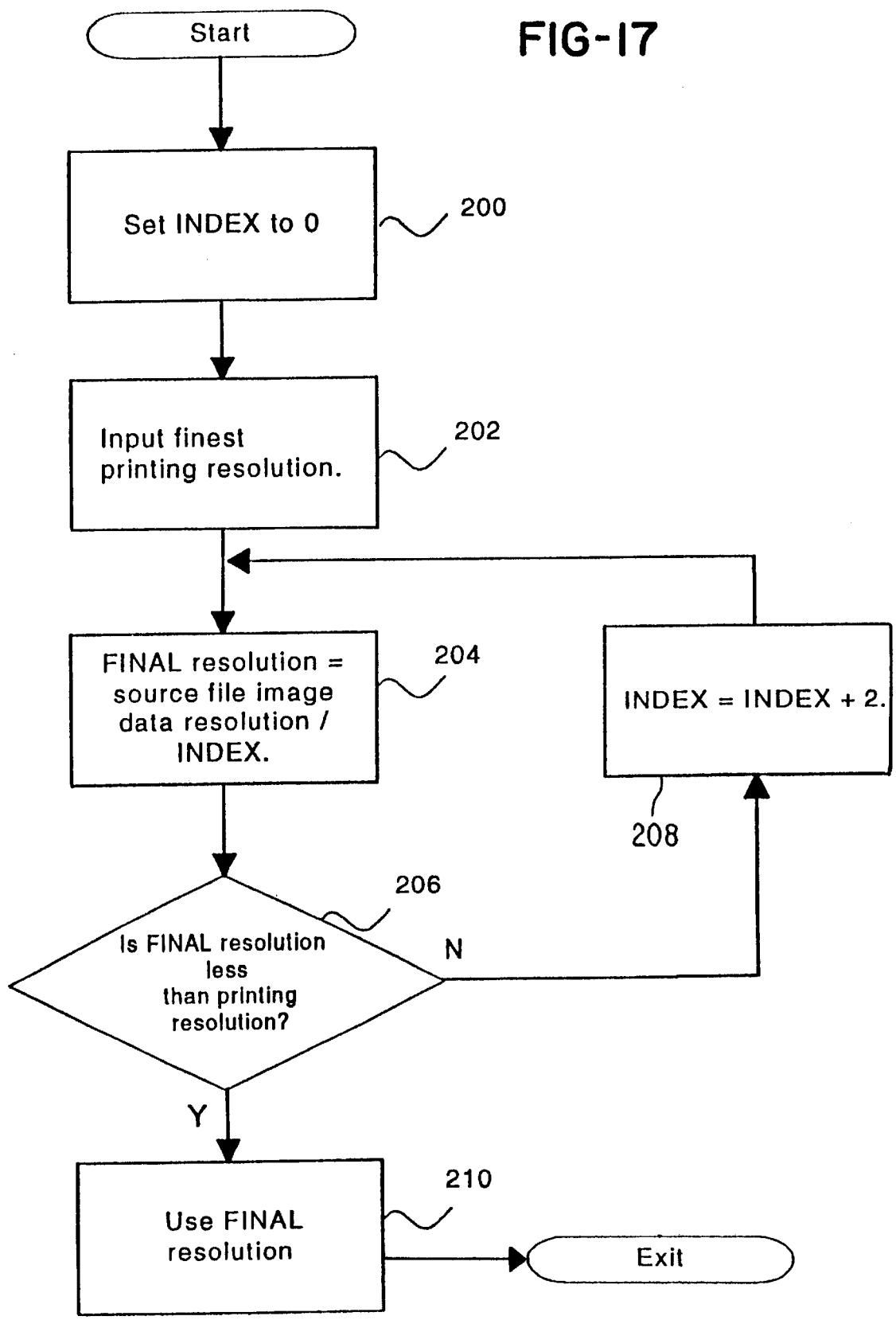

ENGRAVING SYSTEM AND METHOD FOR ENGRAVING INTAGLIO AND NON-INTAGLIO PATTERNS

CROSS REFERENCE TO RELATED APPLICATIONS

This application is a continuation of Ser. No. 08/886,488 filed Jul. 1, 1997 (U.S. Pat. No. 5,892,589), which is a continuation of Ser. No. 08/376,858 filed Jan. 23, 1995 (U.S. Pat. No. 5,675,420).

BACKGROUND OF THE INVENTION

This invention relates to engraving and, more particularly, to an intaglio engraving method and apparatus not previous known.

In some areas of the printing industry, there is a need and, perhaps, a requirement that printed images have great detail. Such images are often printed with one or more very fine lines using intaglio printing plates. For example, the currency of most countries as well as many securities and other important documents are printed using intaglio printing plates.

In the past, intaglio printing was typically performed using intaglio printing plates which were flat. The intaglio printing plates consisted of lines or dots recessed below the surface of the plates. The intaglio printing plates were usually engraved by hand and, consequently, were very time consuming to engrave. Also, it was very difficult and time consuming to generate identical plates for multi-color printing processes since the intaglio printing plates were engraved manually.

Attempts have been made in the past to automate the manufacture of the intaglio printing plates by engraving the intaglio images on cylinders. For example, attempts have been made to engrave intaglio images on the cylinders using rotogravure engraving equipment. While such rotogravure equipment has been used to engrave cylinders having large cell areas for receiving viscous liquids such as glue, such rotogravure engravers of the past were not suitable for engraving intaglio patterns having one or more fine or thin lines on cylinders used in printing. This is partly because the rotogravure engravers typically engraved cups or cells having a shape similar to the engraved cells shown in FIG. 6A. Also, cells were not generally rectangular or square in cross section, but rather had a more concave shape as shown in FIG. 6B. Thus, sharp contrasts and print densities were difficult to achieve. The engraving heads which engraved those cells typically had a rise time which is the time required to engrave from a white depth to a full black depth. The rise time of prior art engravers was on the order of about 300 microseconds.

The shape of the cells was dictated in part by the shape of a stylus used to engrave the cells and the speed at which the cells were being engraved. A typical stylus of a gravure engraver of the past is shown in FIG. 5. The typical rise time for an engraving head using this stylus was on the order of about 300–400 microseconds. Because of the very slow rise time of the engravers of the past, it was very difficult to engrave relatively thin, deep horizontal lines (i.e., lines which were generally parallel to the axis of the cylinder) or any thin intaglio lines which were not vertical (i.e., generally perpendicular to the axis of the cylinder).

Unfortunately, this rise time was not adequate to perform intaglio engraving because the height of an engraved column or portion of a character (i.e., the portion of the character that was generally parallel to the rotational axis of the cylinder that can be engraved) is limited by the response time of the engraver and associated time T (FIG. 6B) it takes for the engraver to go from a white area X to a full depth black area Y. The height of such a line and the time T is, in turn, inversely related to the speed of the engraving head and the rotational speed of the cylinder. To increase the response time, the rotational engraving speed of the cylinder had to be slowed down. This also meant that the overall time it took to engrave was increased.

Also, intaglio patterns which had large areas engraved on the cylinder did not print well because the flow of ink into and out of the engraved areas was not controlled well.

Thus, the gravure engravers of the past were limited in design and ability when engraving fine line intaglio patterns.

What is needed, therefore, is a method and apparatus capable of engraving intaglio patterns at acceptable engraving speeds.

SUMMARY OF THE INVENTION

It is a primary object of this invention to provide an engraving method and apparatus for engraving an intaglio pattern on a cylinder during the rotation of the cylinder.

It is another object of this invention to provide an intaglio engraver having means for engraving fine lines.

Another object of this invention is to provide an intaglio engraver having means for boosting some or all of an intaglio source data to a resolution which can be engraved by the engraver without disturbing the intaglio source image.

Still another object of this invention is to provide a method and apparatus for controlling ink flow in the intaglio pattern being engraved.

Yet another object of this invention is to provide a method and apparatus for providing an engraving head which is capable of achieving response times of 100 microseconds or less and which uses a stylus having a predetermined or special profile.

In one aspect, this invention comprises an intaglio engraved pattern for engraving a cylinder for printing an intaglio pattern comprising a plurality of engraved areas engraved to define the intaglio engraved pattern, the plurality of engraved areas each defining an engraved area having a bottom that is generally planar.

In another aspect, this invention comprises a method for engraving an intaglio engraved pattern on a cylinder for printing an intaglio pattern comprising, providing an engraver for engraving a plurality of engraved areas engraved to define the intaglio engraved pattern, the plurality of engraved areas each defining an engraved area having a bottom that is generally planar.

These aspects, objects and advantages of the features of this method and apparatus, and others, will become further apparent from the following drawing, detailed description of the invention, along with the appended claims and abstract.

BRIEF DESCRIPTION OF THE DRAWINGS

FIG. 8A is a fragmentary plan view showing a plurality of intaglio trenches;

FIG. 8B is a fragmentary cross-sectional view of one of the intaglio trenches shown in FIG. 8A showing the steep angles into and out of the intaglio trench and an associated rise time $T_2$;

FIG. 8D is a picture of a pattern of gravure-engraved cells of the same pattern depicted in FIG. 8C;

FIG. 17 is a general schematic showing an interpolation routine in accordance with one embodiment of this invention.

DETAILED DESCRIPTION OF PREFERRED EMBODIMENT

Figure 1:
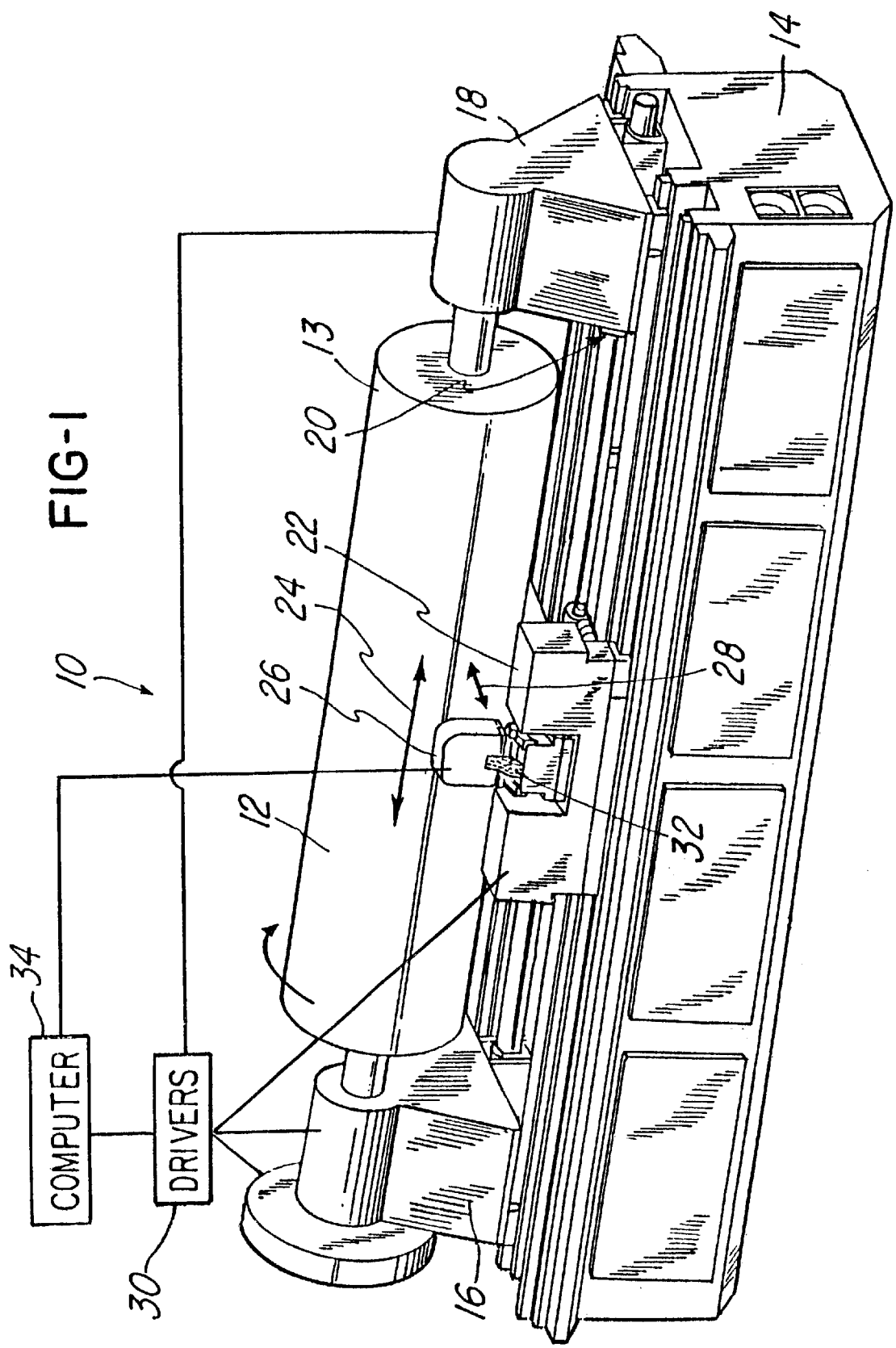
FIG. 1 is a general perspective view of an intaglio engraver having an engraving head according to an embodiment of this invention.

FIG. 1 is a general perspective view of an engraver, designated generally as engraver 10. The engraver 10 is an intaglio engraver for engraving a cylinder 12 which will subsequently be used to print a predetermined intaglio pattern as described below. The cylinder 12 has a surface 13 which has an engravable coating, such as copper, similar to the type used ine gravure engraving.

The engraver 10 comprises a base 14 having a headstock 16 and tailstock 18 slidably mounted on a bed 20 situated on the base 14. The headstock 16 and tailstock 18 are slidably and adjustably mounted on the bed 20 with suitable bearings and drive train (not shown) such that the headstock 16 and tailstock 18 can rotatably support the cylinder 12 therebetween. The engraver 10 also comprises a carriage 22 which is also slidably mounted on the bed 20 with suitable bearings and drive train (not shown). The carriage 22 may be driven in the direction of double arrow 24 in order to effect engraving as described below. Notice also that the engraver 10 comprises an engraving head 26 which is slidably mounted on carriage 22 such that it can be driven towards and away from the cylinder 12 in the direction of double arrow 28 in FIG. 1.

The engraver 10 also comprises a plurality of actuators, drive means or drivers 30 which are capable of rotatably driving the cylinder 12. The drivers 30 also comprise suitable motors and drive mechanisms (not shown) for selectively driving carriage 22 and engraving head 26. If desired, the drivers 30 may also comprise at least one suitable drive motor and drive train (not shown) for driving the headstock 16 and tailstock 18 into and out of engagement with the cylinder 12, thereby eliminating the need for manual adjustment. For example, the drivers 30 may cause the headstock 16 and tailstock 18 to be actuated to a fully retracted position (not shown) or to a cylinder support position shown in FIG. 1. The drivers may be selectively energized to cause the headstock 16 and tailstock 18 to be actuated either independently or simultaneously.

Although not shown, a single drive motor may be used with a single lead screw (not shown) having reversed threads (not shown) on which either end causes the headstock 16 and tailstock 18 to move simultaneously towards and away from each other as the lead screw is driven. Driving both the headstock 16 and tailstock 18 permits cylinders 12 of varying lengths to be loaded by an overhead crane, for example, whose path is perpendicular to the axis of rotation of the engraver 10. However, it should be appreciated that a stationary headstock 16 and tailstock 18 may be used with a driven tailstock 16 or headstock 18, respectively, if, for example, a cylinder loading mechanism (not shown) loads the cylinder 12 by moving it in a direction which is generally parallel to the axis of rotation of the engraver.

In addition, the drivers 30 may also drive a lead screw (not shown) which is coupled to the carriage 22 in order to effect driving the carriage 22 in the direction of double arrow 24. Likewise, drivers 30 may also drive a drive train or a leadscrew which causes the engraving head 26 to move on the carriage in the direction of double arrow 28 towards and away from cylinder 12. The engraving head 26, carriage 22 and the driven movement thereof is similar to that shown in U.S. Pat. Nos. 5,438,422; 5,424,845; 5,329,215; 5,424,846 and 4,450,586 issued to the same assignee as the present application on May 22, 1984; U.S. Pat. No. 4,438,460 issued to the same assignee as the present invention on Mar. 20, 1984; U.S. Pat. No. 4,357,633 issued to the same assignee as the present invention on Nov. 2, 1982; and U.S. Pat. No. 5,329,215 issued to the same assignee as the present invention on Jul. 12, 1994, all of which are incorporated herein by reference and made a part hereof.

The engraver 10 comprises control means, a controller or a computer 34 for controlling the operation of the engraver 10, engraving head 26 and also for generating an intaglio engraving signal 38 (FIG. 10A) corresponding to the selected predetermined intaglio pattern to be engraved. The computer 34 also selectively controls all the drive motors, such as drivers 30 mentioned above, in the engraver 10.

Figure 2:
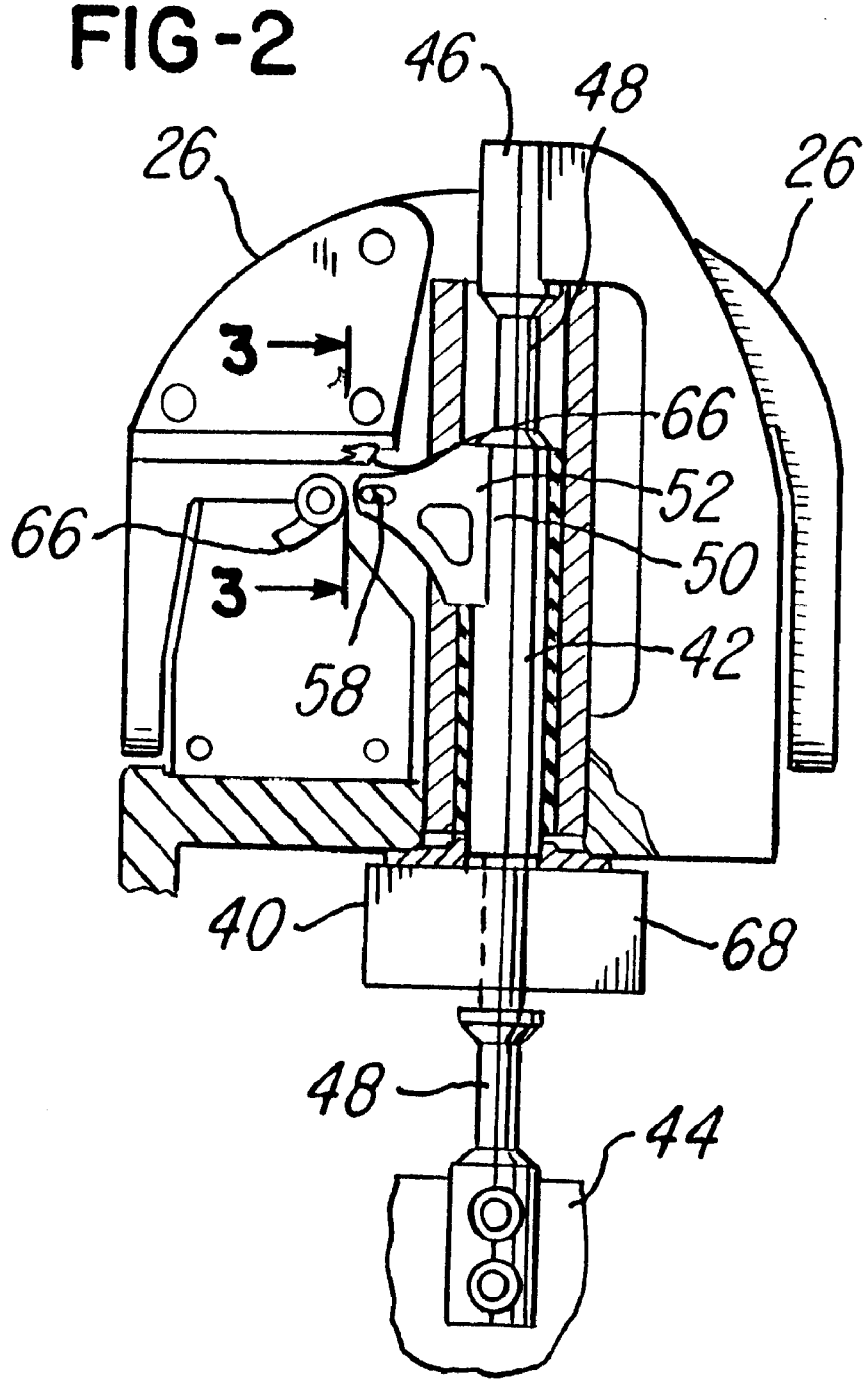
FIG. 2 is a partly broken away sectional view of the engraving head shown in FIG. 1, showing details of an actuator arm, stylus support, and stylus.

As best illustrated in FIG. 2, the engraving head 26 is similar in construction and operation to the gravure engraving heads shown in one or more of the above-referenced patents, and comprises an armature 40 which is rigidly secured to a shaft 42 between opposite end portions 44 and 46 by torsional spring portions 48 of reduced diameter. In the embodiment being described, the shaft 42 has a diameter of about 0.625 inch, and the torsional spring portions each have a diameter of about 0.060 inch. It should be appreciated that the torsional spring portions 48 and shaft portion 42 comprise a thickness diameter and weight which are selected to provide a predetermined rise time of less than approximately 100 microns. In the embodiment being described, the predetermined response time for the engraver 10 for engraving the intaglio pattern is on the order of about 75 to 200 microseconds.

Figure 4:
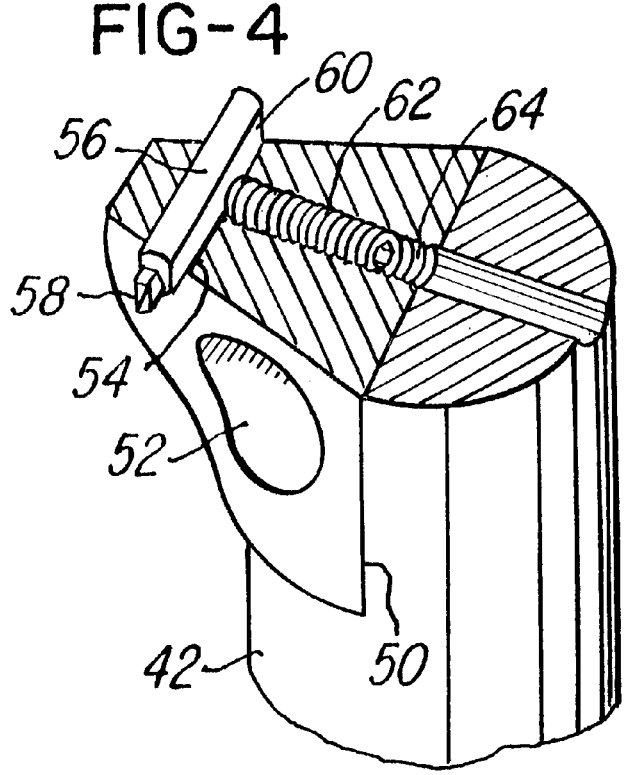
FIG. 4 is a fragmentary view showing details of the stylus arm and stylus.

A notch 50 is formed within the shaft portion 42 and supports an actuator arm 52 which is rigidly secured to the shaft portion 40 by a set of screws (not shown). A cylindrical transverse hole 54 (FIG. 4) is formed within the actuator arm 52, and an elongated rod-like holder 56 is disposed within the hole 54. A cutting stylus 58, preferably formed of diamond, is integrally formed or cemented into one end of the holder 56 which has a flat surface 60. The surface 60 is engaged by a set screw 62 which is threaded into a hole 64 extending outwardly from the shaft 42 through the actuator arm 52 and intersecting the hole 54.

The actuator arm 52 is rigidly secured to the shaft 42 and projects outwardly between a pair of opposing electromagnets (not shown) which are mounted within the base portion of the engraving head 26. When the magnets (not shown) are energized the actuator arm 52 oscillates through an arc of approximately 0.25 degrees.

Figure 3:
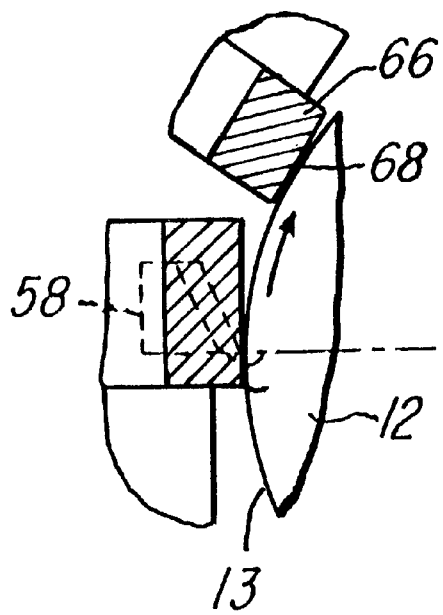
FIG. 3 is a partly broken away sectional view showing an engraving shoe and the stylus in operative relationship with a cylinder.

As shown in FIG. 2, guide shoe 66 is preferably formed of diamond and has a surface 68 (FIG. 3) which engages the surface of the cylinder 12 to be engraved. The construction and operation of the guide shoe 66 is similar to that shown in one or more of the above-referenced patents.

Notice that little or no dampening material has been situated around the shaft 42 (FIG. 2), end portions 44 and 46 and torsional spring portions 48, unlike engraving heads of the past. This facilitates reducing the response time of the engraving head 26.

Figure 7:
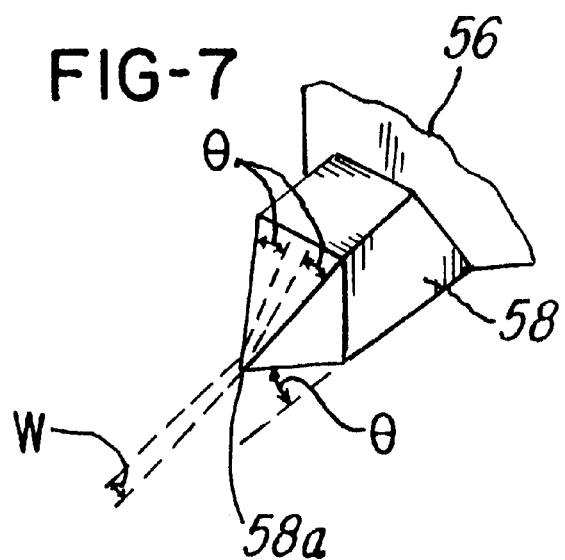
FIG. 7, which is on the same sheet as FIG. 3, is a fragmentary view showing a bull nosed stylus according to one embodiment of this invention.
Figure 5:
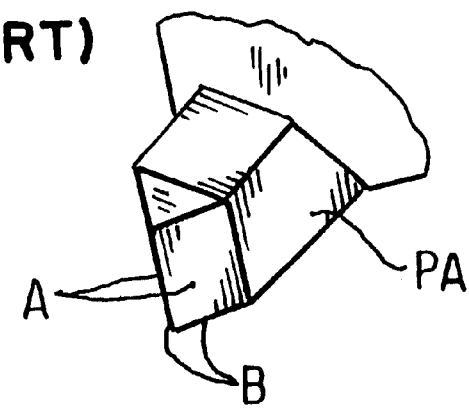
FIG. 5, which is on the same sheet as FIG. 6, is a fragmentary view of a prior art stylus.

As best illustrated in FIG. 7, the holder 56 in the embodiment being described has a stylus 58 which is integrally formed or secured thereto and which is generally U-shaped or bull-nosed shaped as shown. The stylus 58 comprises a relief angle $\Theta_1$ in FIG. 7 of more than 5 degrees in one embodiment and may vary between 0 and 60 degrees, if desired. It has been found that an angle $\Theta_1$ of about 20 degrees is suitable.

Notice that stylus 58 comprises a roof angle $\Theta_2$ (FIG. 7) on the order of about 60 degrees. Notice also that the tip of the stylus 58 defines a linear engaging edge or surface 58a for engaging the cylinder 12. In the embodiment being described, the width W is about 20 microns. It should be appreciated, however, that while this embodiment of the invention has been shown with a stylus having the profile and shape shown in FIG. 7, other suitable shapes may be selected depending on the cross-sectional shape of the intaglio trench to be engraved.

Figure 8C:
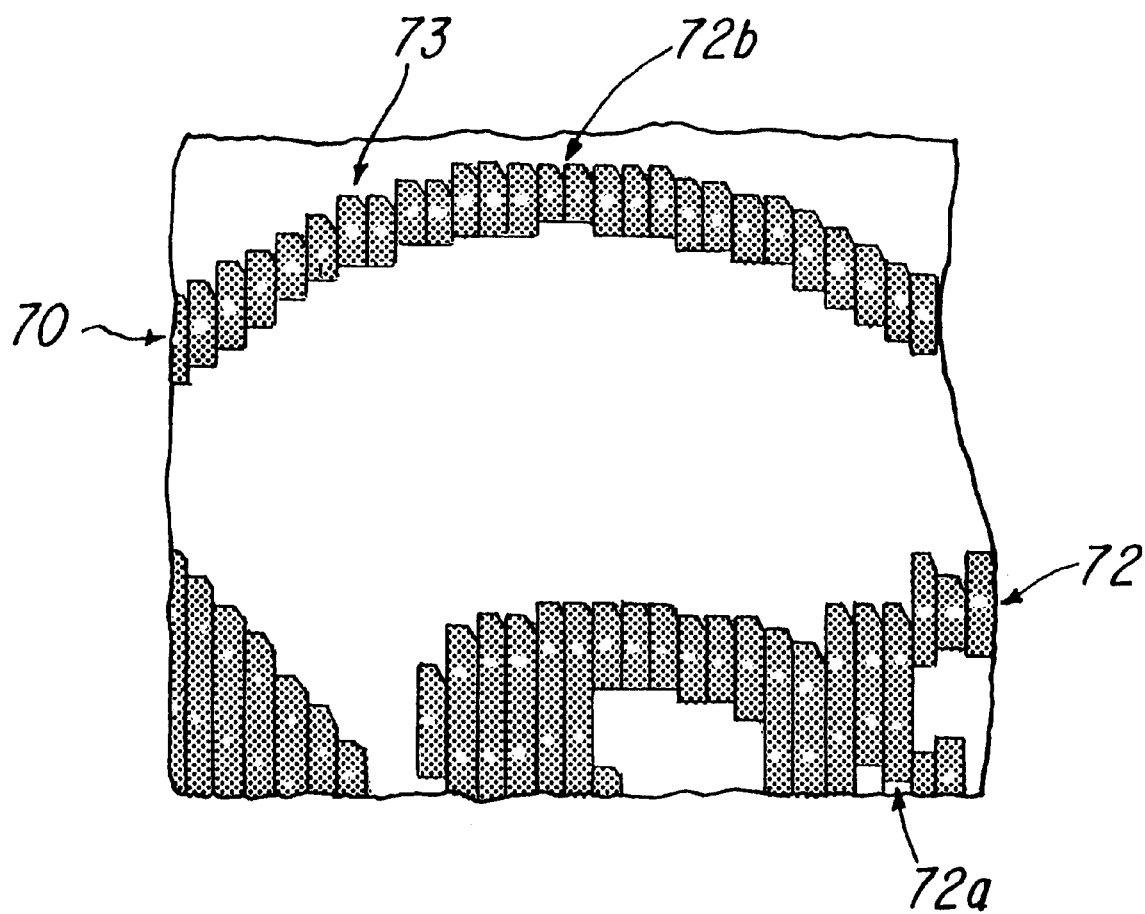
FIG. 8C is a picture of a portion of an engraved pattern showing a plurality of engraved intaglio trenches.

The engraving head 26 is slidably located on carriage 22 and is coupled to drivers 30 and computer 34. In a manner similar to engraving heads used in gravure engravers of the past, the engraving head 26 is caused to be positioned in operative relationship with cylinder 12. At the appropriate time and in a manner described below, the computer 34 energizes engraving head 26 to engrave a desired preselected intaglio pattern or portion of an intaglio pattern, such as the picture of a portion of an actual intaglio pattern 70 shown in FIG. 8C. Notice that the intaglio engraving pattern 70 may define a substantially continuous and non-linear intaglio character 73 or a portion of the character shown in FIG. 8C comprises of multiple intaglio trenches or grooves 72. As illustrated in FIG. 8A, notice that a character or portion 77 may be comprised of a plurality of trenches or elongated intaglio trenches 77a. These trenches 77a may be engraved such that they are continuous and connected, or they may be engraved such that one or more engraved areas or trench walls 77b are defined therebetween.

Figure 6A:
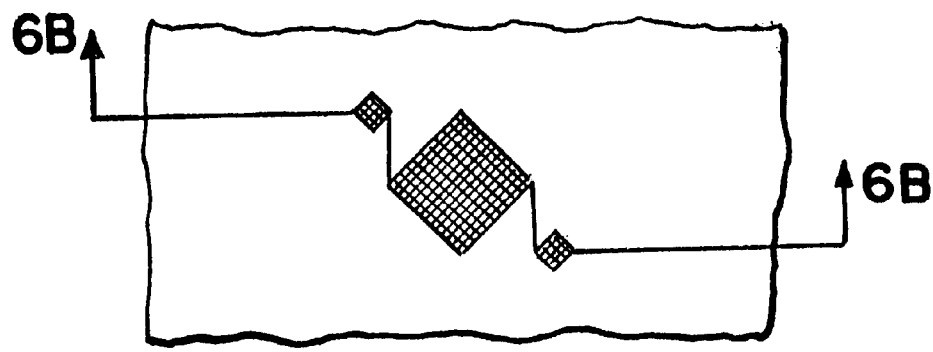
FIG. 6A is a plan view of a plurality of prior art cells of the type engraved with the stylus shown in FIG. 5.
Figure 6B:
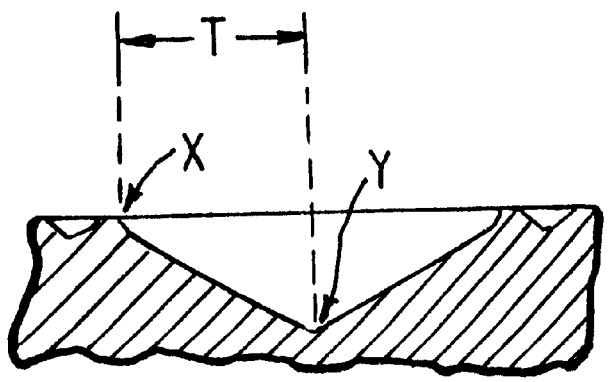
FIG. 6B is a fragmentary cross-sectional view taken along the line 6B—6B in FIG. 6A, showing the shape of a typical prior art cell.

As shown in FIG. 8B, each intaglio trench 77a is engraved to define a groove or channel having a generally planar bottom 79. Notice trench 77a has a very steep forward wall 81 and rear wall 83. The forward wall 81 may be engraved with engraving head 26 having a response time (visually indicated by double arrows $T_2$ in FIG. 8B) on the order of about 100 microseconds in the embodiment being described. Notice that some of the intaglio trenches or channels shown in FIGS. 8A and 8C, like trench 72a, are generally elongated while others, like trench 72b, have a fairly short or narrow height. In the embodiment being described, the engraver 10 is capable of engraving intaglio trenches having a cross-sectional shape as shown in FIG. 8B and having a length X (FIG. 6B) as long as desired or as short as about 1/500 or 0.002 inch for the engraving head 26 when engraving at about 500 dpi.

In contrast, FIG. 8D illustrates another character 89 which was shown engraved using a traditional gravure engraver of the type referred to above. Notice the gravure cells 91 at the top of the character, indicated by arrow 93, that gravure cells are very small and shallow. When these cells are used during actual printing, the printed image will appear non-continuous and as dots, much like the engraved cells appear in FIG. 8D.

Figure 9A:
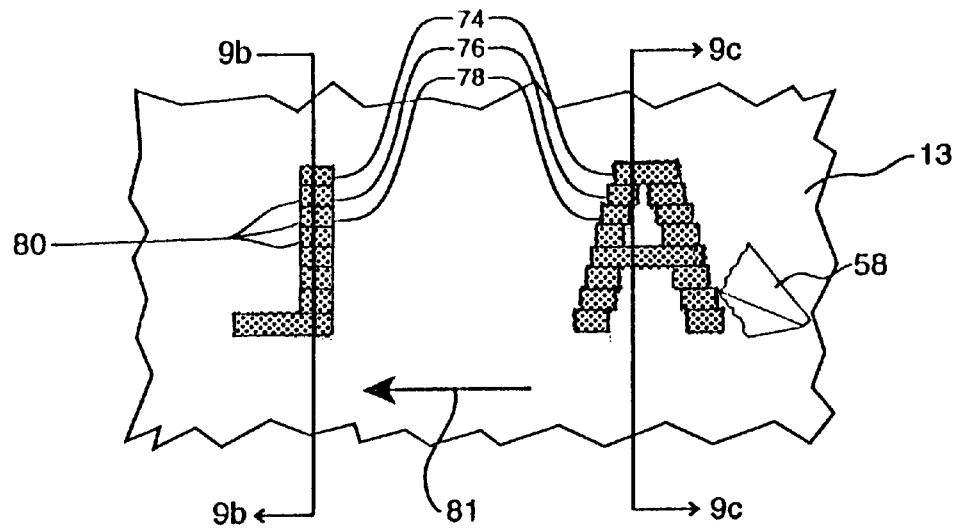
FIG. 9A is a fragmentary view of the letters L and A which were engraved on a cylinder using multiple engraving passes as the cylinder rotated in the direction of arrow 81.
Figure 9B:
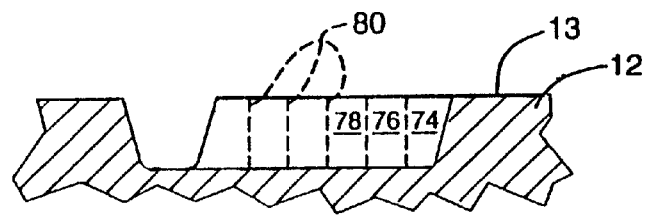
FIG. 9B is a fragmentary sectional view taken along the line 9B—9B in FIG. 9A, showing details of the intaglio trenches forming the letter L.
Figure 9C:
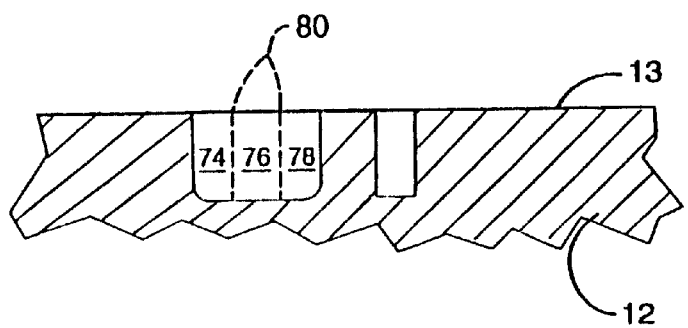
FIG. 9C is a fragmentary sectional view taken along the line 9C—9C in FIG. 9A, showing details of the intaglio trenches which form a portion of the letter A.

Another illustration of an intaglio engraved area or trench according to one embodiment of this invention is shown in FIGS. 9A–9C. In this illustration, the intaglio engraving for the letters L and A is shown. Notice that the stylus 58 engraves or "digs" successive trenches, such as channels, grooves or trenches 74, 76, and 78, as the cylinder 12 rotates in the direction of arrow 81 in FIG. 9A. Notice also in the corresponding sectional fragmentary view in FIG. 9B that the trenches 74, 76 and 78 define a generally continuous intaglio trench 83 which defines the intaglio character illustrated in FIG. 9A. For ease of illustration, each successive engraving pass has been identified or separated by the imaginary lines 80 in FIGS. 9A–9C. As mentioned earlier herein, the computer 34 comprises means for generating the intaglio engraving signal corresponding to the predetermined intaglio pattern for the letters "L" and "A". When the signal is used to energize engraving head 26, it will effect engraving of the desired predetermined intaglio pattern 70 shown in FIG. 8. Generation of the intaglio engraving signal is described later herein.

Figure 10A:
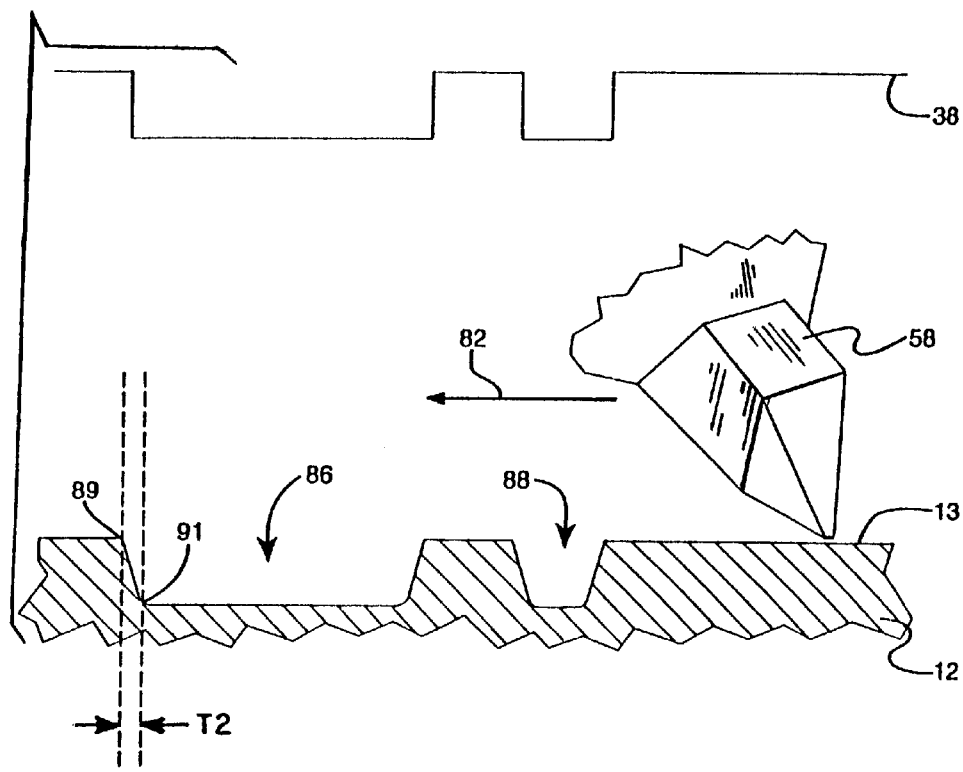
FIG. 10A is a fragmentary sectional view of a portion of the cylinder engraved in accordance with a corresponding intaglio engraving signal.
Figure 10B:
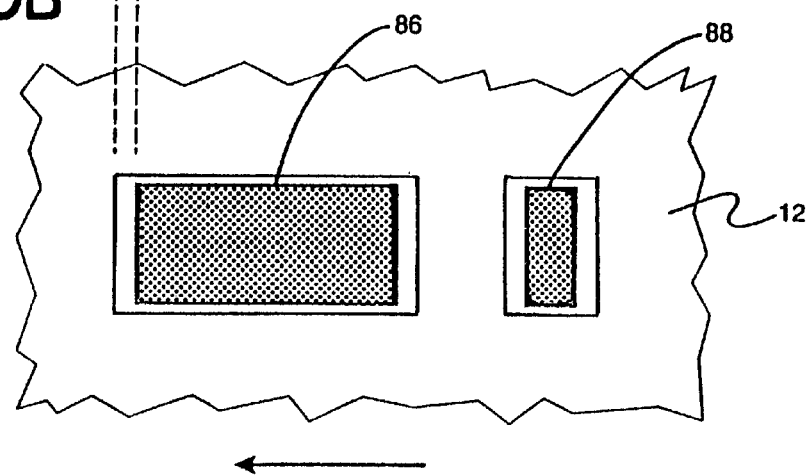
FIG. 10B is a fragmentary plan view of a pair of generally rectangular intaglio-engraved images corresponding to the intaglio engraving signal shown in FIG. 10A.

FIGS. 10A and 10B show a partially broken-away cross-sectional illustration of two generally rectangular intaglio characters or portions of characters 86 and 88 formed from a plurality of channels or trenches engraved by the engraving head 26 in response to an intaglio engraving signal 38 as cylinder 12 rotates in the direction of arrow 82. This waveform signal is a pulse-width modulated signal representing or generally corresponding to the intaglio image data after modification as described herein. FIG. 10B is a corresponding fragmentary top view showing the trenches 86 and 88 engraved during multiple passes using signal 38 (FIG. 10A) during the rotation of the cylinder 12. Notice, again, the short rise or response time represented by the double arrow $T_2$ in FIG. 10B. In the embodiment being described, the engraving response time $T_2$ is on the order of about 200 microseconds or about between 75 to 300 microseconds.

Figure 11:
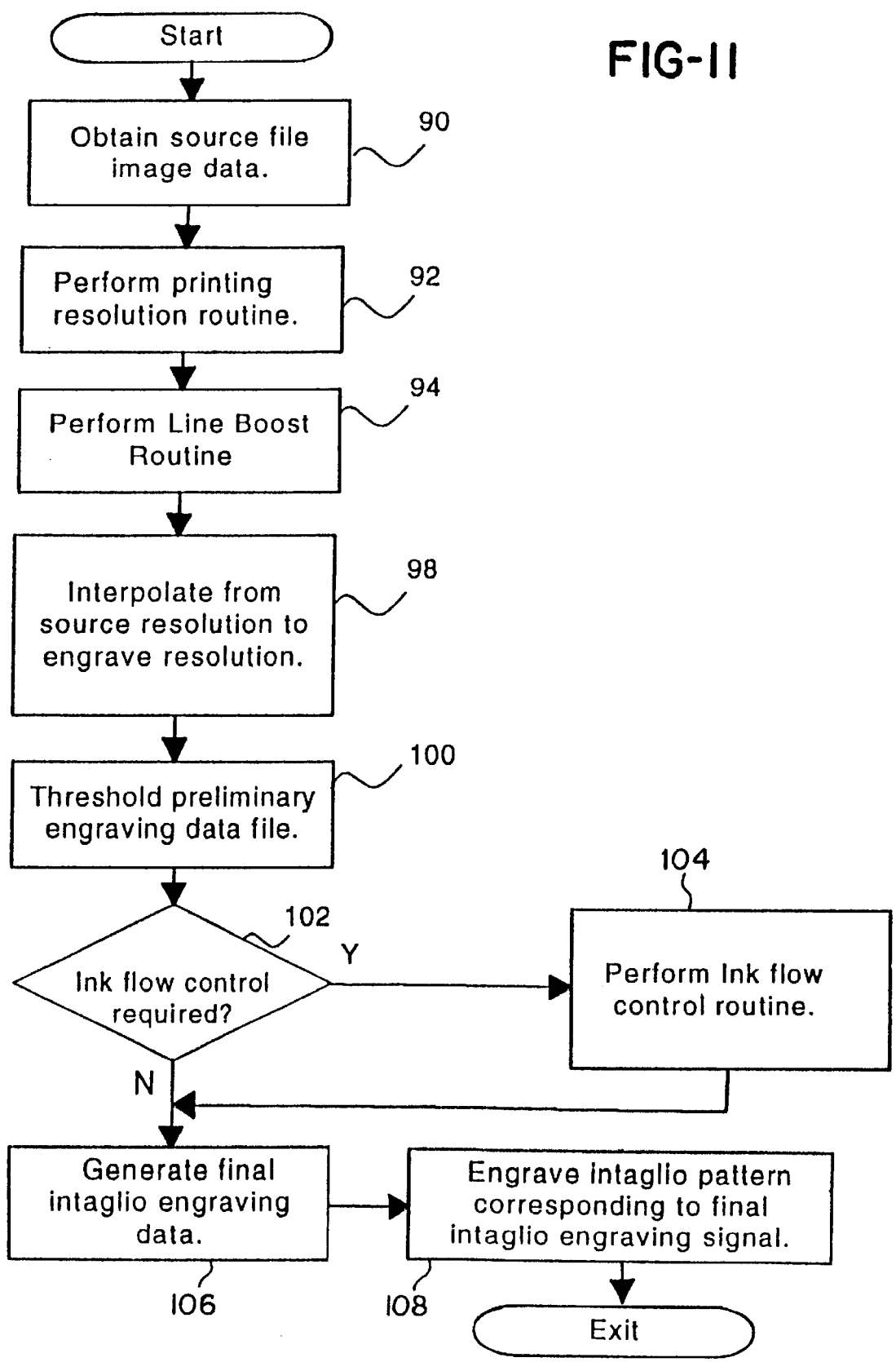
FIG. 11 is a general schematic diagram showing a method according to an embodiment of this invention.
Figure 15A:
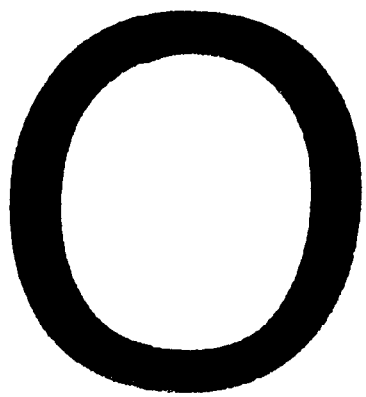
FIG. 15A is an image of a source character "O" for purposes of illustration.

Referring now to FIG. 11, a process or method by which computer 34 generates an intaglio engraving signal suitable for engraving an intaglio pattern is shown schematically. First, the computer 34 obtains source file image data or a set of data (block 90) for a character to be engraved. Computer 34 obtains this data from memory or it is inputted by a user via a work station or other input device (not shown). For example, data representing the character "O" in FIG. 15A would be generated or obtained by computer 34.

A printing resolution routine (FIG. 17) described below is then performed at block 92. In this regard, the source file image data is analyzed to determine the resolution which engraver 10 will engrave the intaglio pattern.

The source file image data is typically supplied by computer 34 at a resolution which is greater than the engraving resolution capability of engraver 10. The source file image data is provided at this higher resolution in order to assure maximum image detail corresponding to the source image. For example, the source image shown in FIG. 15A may be provided by computer 34 at 2000 dots per inch ("dpi"), while the engraver 10 has an engraving resolution capability of about 500 dpi in the embodiment being described. Consequently, it is necessary to modify the source file image data to a resolution that is achievable by the engraver 10 while maintaining maximum contrast in the modified source image.

Figure 15B:
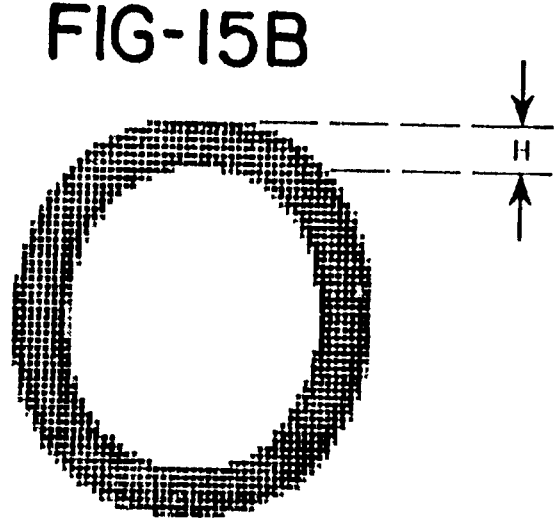
FIG. 15B is an image of data file corresponding to the character shown in FIG. 15A and illustrating a height H which may be analyzed by the fine line boost routine.

Once the engraving resolution is determined, it may be desirable to boost some or all of the source file image data to a minimum desired or predetermined length. For example, as illustrated in FIG. 15B, the letter "O" has an associated minimum desired engraving height H as indicated. In the embodiment being described, if the height H is less than a predetermined length, then it may be desirable to boost or enhance the source file image data corresponding to that data height H to the appropriate height which will allow the predetermined engraving resolution to be obtained. Thus, for example, in the embodiment being described, the engraver 10 has a predetermined engraving resolution of about 500 dpi. Consequently, if a portion of the intaglio pattern comprises a height H which will not allow 500 dpi to be obtained, then it may be desirable to boost that portion of the source file image data in accordance with a source file boost routine (block 94 in FIG. 11). The source file boost routine is described later herein.

At block 98, the boosted or non-boosted source file image data is interpolated to an engraving resolution using a conventional bi-linear interpolation or image recrypting. One suitable approach for such interpolation is described at Section 14.5, *Digital Image Processing*, 2nd. Ed., authored by William K. Pratt and published by John Wiley & Sons, Inc., 1991.

Next, the modified engraving source image data is further modified or thresholded in order to adjust the contrast in the intaglio engraving pattern (block 100) in accordance with a predetermined threshold. In the embodiment being described, the predetermined threshold requires that those data points or pixels that represent a density of less than 50 percent of black are set to zero or white and those pixels having an associated density of more than 50 percent of black are set to black. It should be appreciated that other threshold values could be used.

Figure 14A:
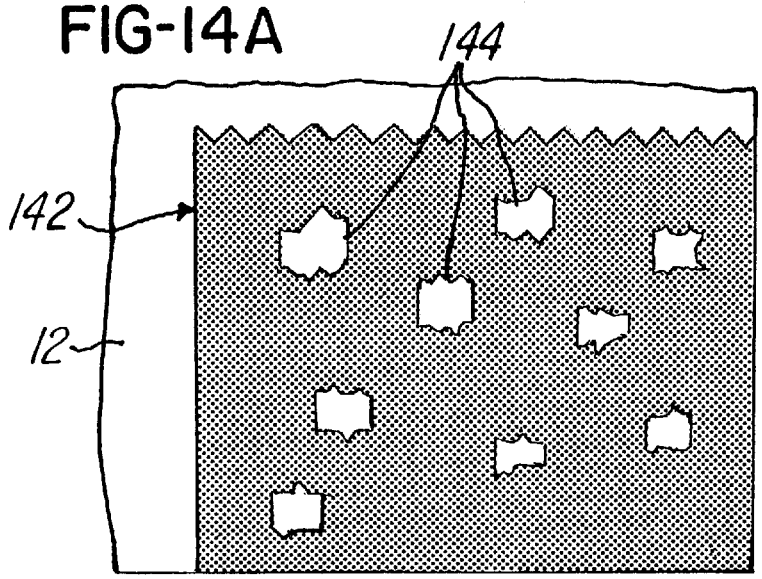
FIG. 14A is a plan view showing a drawing of a portion of an intaglio engraving showing a plurality of ink flow controllers or posts positioned in an engraved intaglio trench.

After the preliminary engraving source file data is modified or thresholded to adjust for contrast, it is determined (decision block 102) whether to situate one or more ink flow controllers, such as ink flow controllers 144 in FIG. 14A, in the intaglio pattern to be engraved on cylinder 12. In this regard, it has been found that having one or more ink flow controllers situated in the area of the predetermined intaglio pattern facilitates controlling the flow of ink during the printing process. This facilitates reducing or eliminating undesirable ink flow or capillary attraction problems when the intaglio pattern is printed. In addition, the ink flow controllers also facilitate providing support for a doctor blade (not shown) in a printing press (not shown).

Figure 14B:
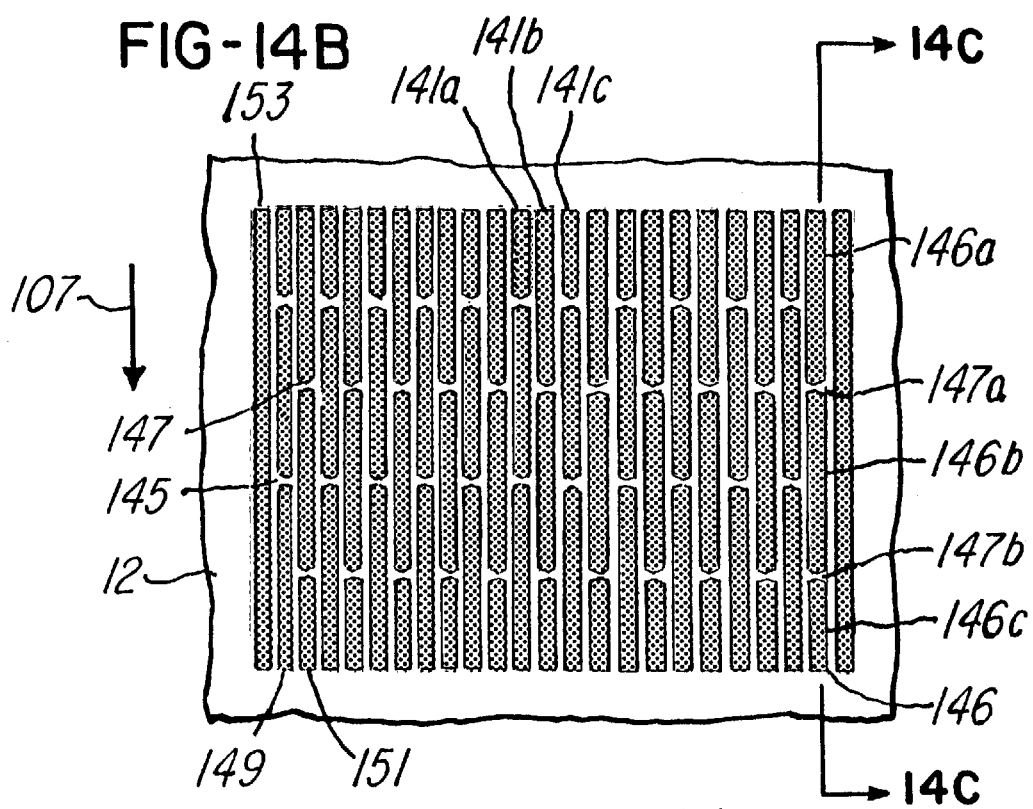
FIG. 14B is a fragmentary showing a plurality of columns of intaglio trenches which were engraved as the cylinder rotated in the direction of arrow 107 and also showing a plurality of staggered ink flow controllers selectively positioned in some of the columns.

FIG. 14A shows a picture of a portion of an intaglio pattern 142 having a plurality of ink flow controllers 144 situated therein. FIG. 14B also illustrates a plurality of ink flow controllers 145 and 147 which were caused to be situated in trenches 149 and 151, respectively. Notice that a trench 153 adjacent trench 149 does not have any ink flow controllers situated therein. Notice also that the ink flow controller routine causes the ink flow controllers, such as ink flow controllers 144 (FIG. 14A) and 145 and 147 (FIG. 14B), to be staggered. This causes an ink flow controller, such as flow controller 145 in FIG. 14B to be positioned between two engraved columns or trenches like trenches 151 and 153.

At the completion of the ink flow controller routine (block 104 in FIG. 11) or if the decision at decision block 102 is negative, then the computer 34 generates (block 106 in FIG. 11) a final intaglio engraving signal corresponding to the preliminary engraving source file data after it has been boosted, thresholded and adjusted.

Figure 15C:
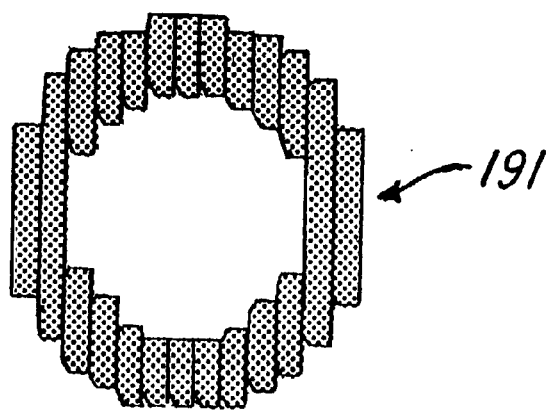
FIG. 15C is a fragmentary view of the source image of FIG. 15A after it was engraved on a cylinder with a plurality of generally elongated and connected intaglio trenches.

The computer 34 then energizes engraving head 26 (block 108) of engraver 10 to engrave the predetermined intaglio pattern, such as the engraved "O" 191 in FIG. 15C, in response to the final intaglio engraving signal at block 108 and exits when finished.

In order to facilitate determining the actual intaglio engraving resolution at which the engraver 10 will engrave the intaglio pattern, the resolution routine is used. The resolution routine is in accordance with one embodiment of this invention is shown schematically in FIG. 17. First, computer 34 sets an INDEX to 0 at block 200. At block 202, computer 34 inputs a finest resolution associated with the engraver 10. The finest resolution corresponds to the minimum black pixel run length (described below) which is to be engraved. This length depends, in turn, on such factors as inks, engraving head 26 response characteristics, printing conditions, substrates and the like. In the embodiment being described, the print resolution is on the order of about 500 dpi. Next, at block 204 a FINAL resolution is set equal to the source file image data resolution divided by the INDEX. At decision block 206, it is determined whether the FINAL resolution is less than the printing resolution determined previously at block 202. If it is not, then the INDEX is incremented by a predetermined number, such as two (block 208). The routine then loops back to block 204 as shown.

If the decision at block 206 is yes, then the FINAL resolution is less than the printing resolution at which time computer 34 uses the FINAL resolution. The routine then EXITS back to block 94 (FIG. 11).

Figure 16A:
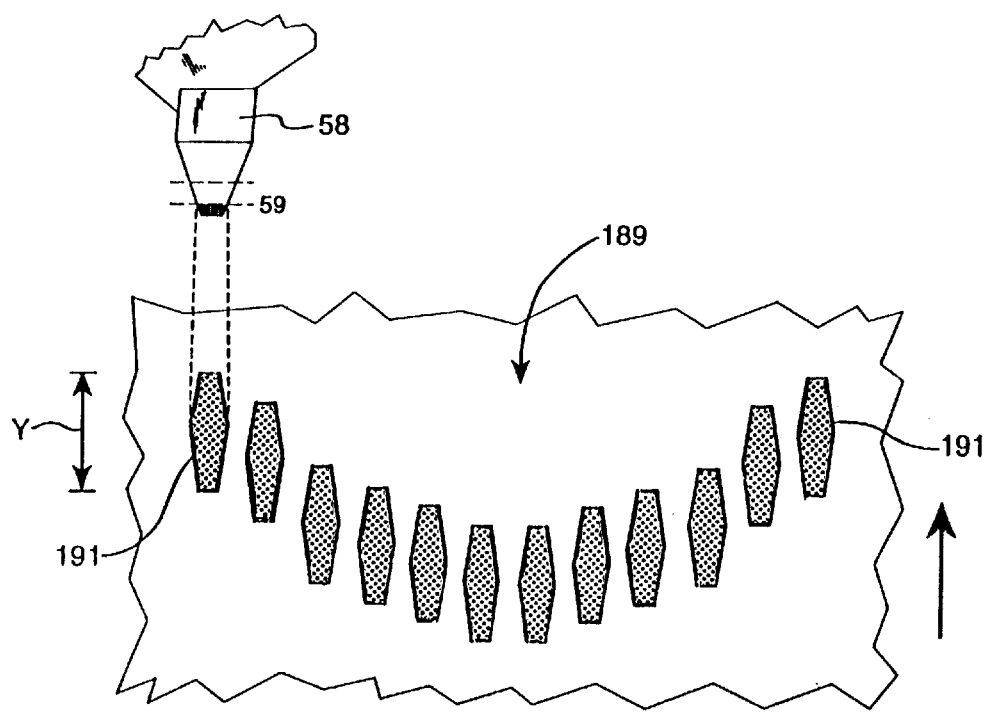
FIG. 16A is a fragmentary plan view of a plurality of intaglio trenches engraved without using the fine line boost routine in FIG. 12.
Figure 16B:
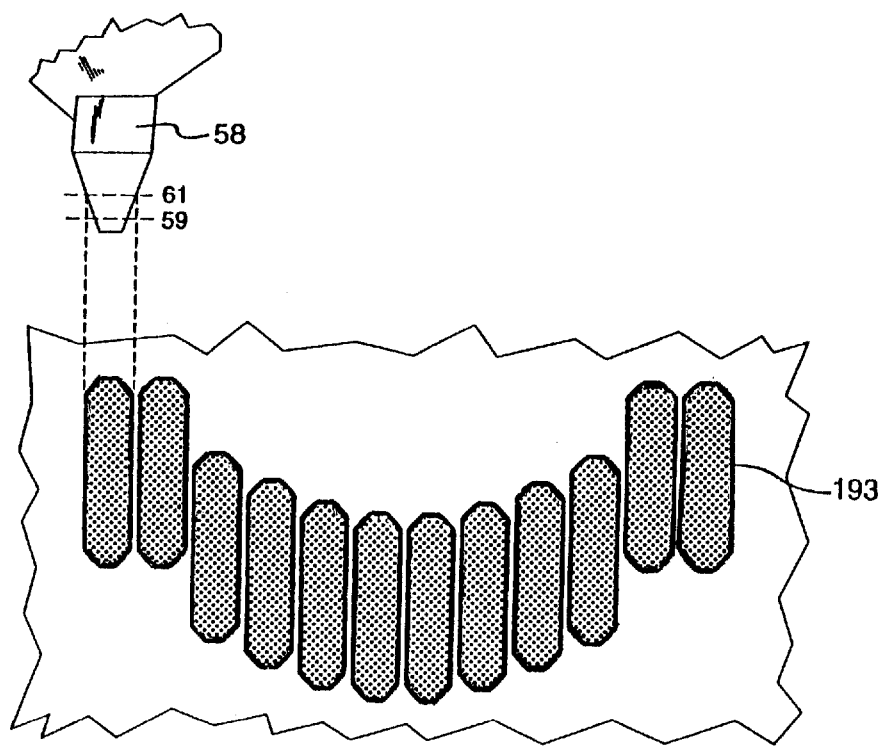
FIG. 16B is a fragmentary plan view of the same intaglio image engraved in FIG. 16A showing a plurality of intaglio trenches engraved after using the fine line boost routine of FIG. 12.

Regarding the source file boost routine (block 94 in FIG. 11), FIG. 16A illustrates a predetermined intaglio pattern that was engraved without utilizing the source file boost routine, and FIG. 16B illustrates the same engraved pattern after utilizing the source file boost routine. Notice in FIG. 16A that the stylus 58 did not get to a complete black depth because the height Y was shorter than the resolution (1/500 inch) of the engraving head 10 in the illustration being described. Consequently, due to the high resolution of the pattern being engraved and the associated small response time required to engrave that pattern, the engraver 10 was only capable of oscillating the stylus to a 50% black depth, indicated by dashed line 59. Stated another way, the resolution of the intaglio pattern being engraved may be finer than the response capability of the engraver. Consequently, the engraver 10 will not be capable of getting "in" and "out" of the surface 13 of the cylinder 12 quick enough to engrave fine lines or areas of the intaglio pattern. As stated above, the engraver 10 will only be capable of engraving to about 50% of a full black depth. This, in turn, causes the intaglio trenches 191 to be shallower, thinner and shorter than desired in the illustration being described. Therefore, this inhibited the ability of engraver 10 to engrave, for example, continuous intaglio trenches which define fine lines or intaglio patterns.

Thus, in order to ensure that the engraver 10 engraved an intaglio trench of appropriate width, height and depth (such as at a 100% black depth represented by dashed line 61 in FIG. 16B), the source file image data may be boosted. This facilitates ensuring that the source file image data is at a resolution which is equal to or less than the resolution capability of the engraver.

Figure 12:
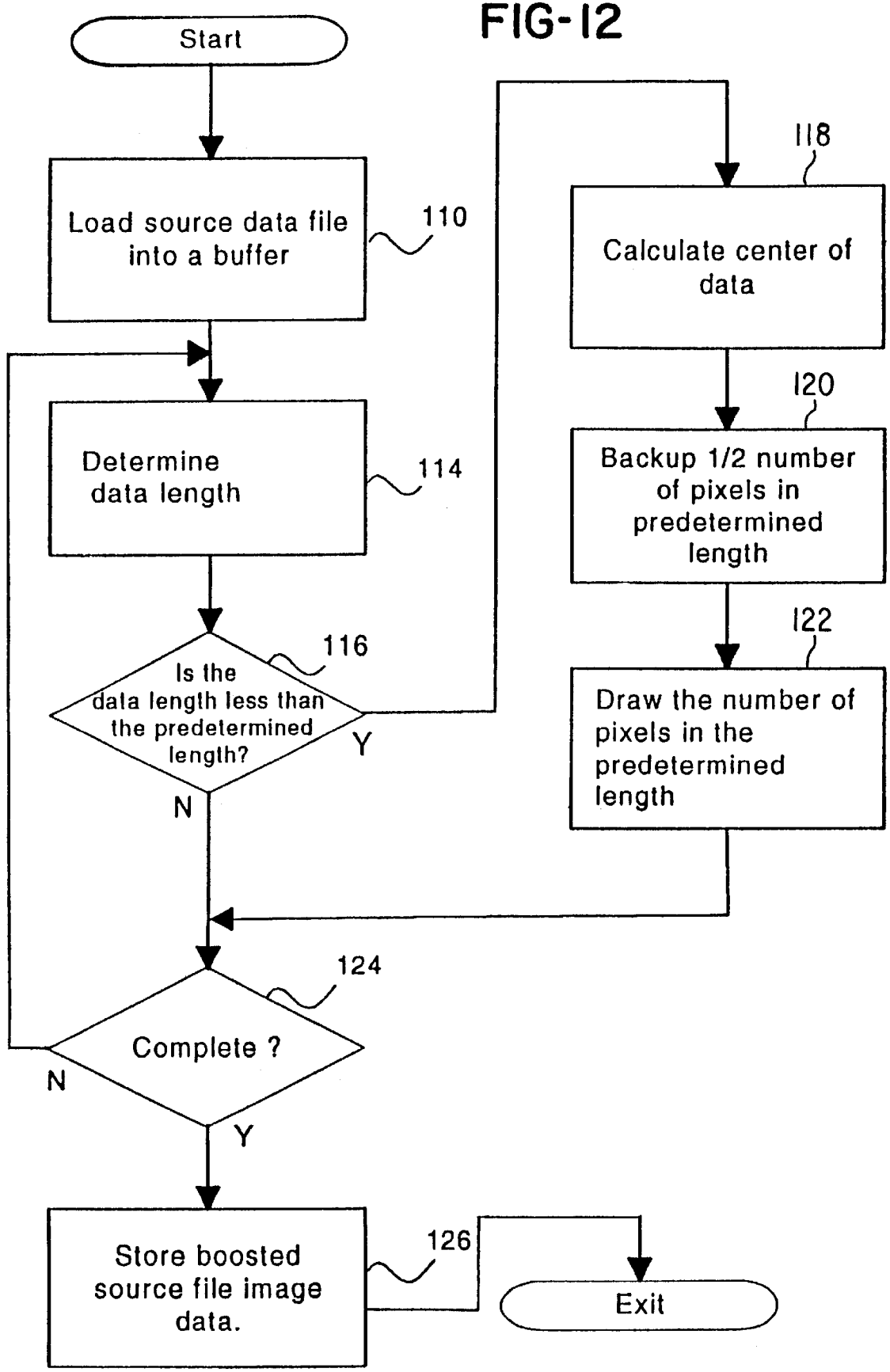
FIG. 12 is a general schematic diagram showing a fine line boost or signal boost routine.

The source file boost routine in accordance with one embodiment will now be described in relation to FIG. 12. After the source file boost routine is initiated, the source file image data is loaded at block 110 into a buffer. The routine proceeds to block 114 where computer 34 determines the data length associated with data runs of one or more black pixels. Once the data length is obtained by computer 34, it is checked at decision block 116 to determine if it is less than a predetermined length. If it is less than the predetermined length, the routine proceeds to block 118 where the center of the data is calculated.

At block 120, the routine backs up approximately one-half the number of pixels in the predetermined length and then proceeds to modify the source file image data to a minimum black pixel run length. In the embodiment being described, the minimum black pixel run length is dependent on various factors, including engraving head 26 response characteristic, printing conditions, inks, substrates and the like.

After either this procedure or if the decision at decision block 116 is answered in the negative, then the routine proceeds to decision block 124 where it is determined if an entire column of pixels for the intaglio image being analyzed is complete (decision block 124). If not, the routine proceeds back to block 114 as shown.

When the routine is complete, it exits and a modified or non-modified data file (block 126) is stored by computer 34 in suitable memory. Thereafter, the routine exits and proceeds to block 98 in FIG. 11.

Figure 14C:
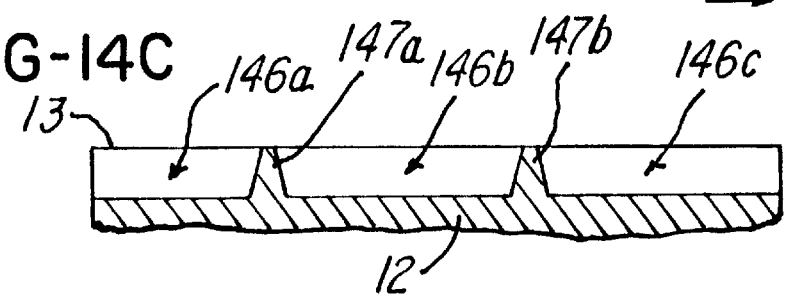
FIG. 14C is a cross-sectional view taken along the line 14C—14C in FIG. 14B.

Regarding the ink controller routine (block 104 in FIG. 11), FIGS. 14B and 14C shows a cross-sectional view of a plurality of ink flow controllers 147a and 147b which were caused to be situated in the engraved trench 146 to define subtrenches 146a, 146b and 146c. Notice that the ink flow controllers, such as ink flow controller 147b in FIG. 14C, could be of a height which defines a white area when the predetermined intaglio pattern is printed. Alternatively, each ink flow controller could define a post or controller of any suitable height, width or shape which facilitates controlling undesirable turbulence and ink flow when the intaglio pattern is printed. In the embodiment being described, it should be appreciated that the ink flow controllers shown in FIGS. 14A–14C represent one pixel generated by the ink controller routine described below. Although not shown, the program or ink controller routine could generate ink flow controllers 144 (FIG. 14A) having any predetermined size, height or width as desired.

Figure 13A:
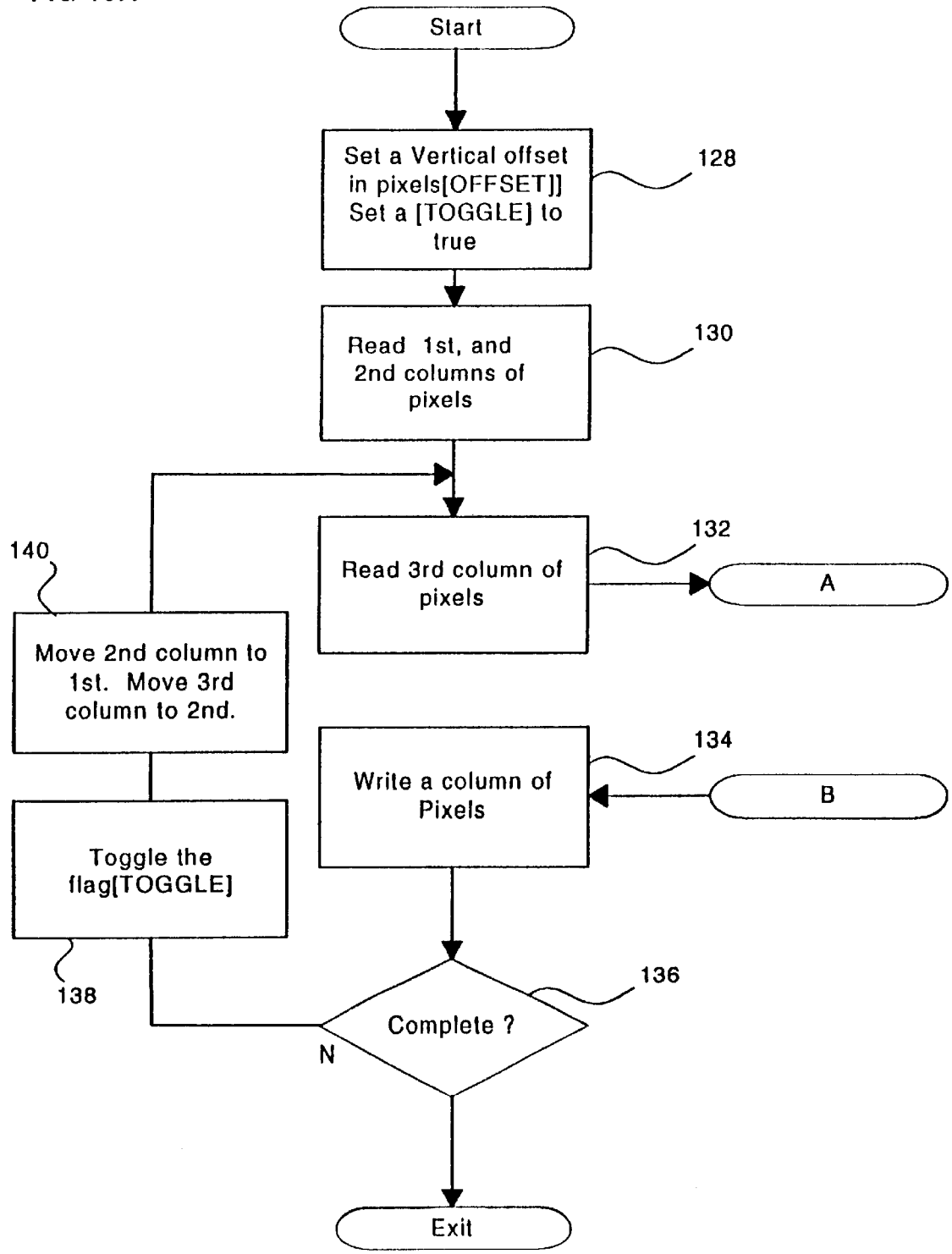
FIGS. 13A—13B, taken together, is a general schematic diagram showing a ink flow controller routine according to one embodiment of the invention.
Figure 13B:
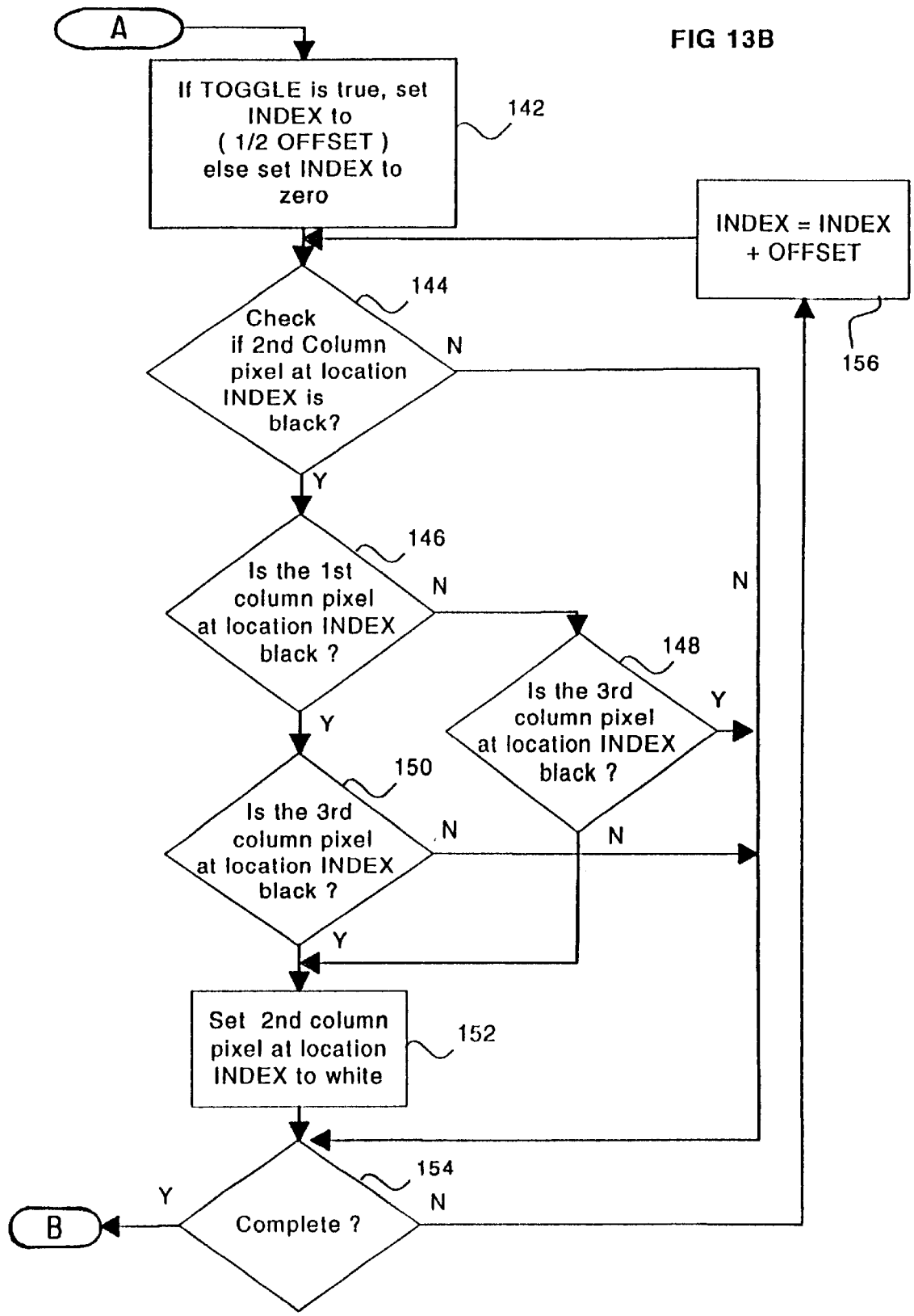

If one or more ink flow controllers 144 are needed, then the computer 34 proceeds to the ink controller routine (block 104 in FIG. 11) which is represented schematically in FIGS. 13A and 13B. Referring to FIG. 13A, computer 34 first sets a vertical offset in pixels as the OFFSET and also sets a toggle to true at block 128. The vertical OFFSET corresponds to the distance between adjacent ink flow controllers. In this illustration, the vertical OFFSET is constant between ink flow controllers. However, it should be appreciated that other algorithms could be utilized to space the ink flow controllers in either a non-symmetrical or symmetrical pattern.

The computer 34 then reads the first and second columns of pixels at block 130, and at block 132, reads a third column of pixels before proceeding to a subroutine A (FIG. 13B). The first, second and third column of pixels correspond to adjacent columns of pixel data corresponding to a portion of the intaglio character to be engraved. For example, in FIG. 14B the first, second and third columns of pixel data may generally corresponds to the engraved areas indicated by adjacent engraved areas 141a, 141b and 141c. As indicated at block 142, if the toggle is true (which it will be through the first pass through the routine), the INDEX is set to one-half of the OFFSET, otherwise, the INDEX is set to zero. The routine then proceeds to decision block 144 where the second column pixel at the INDEX location is checked to determine whether it is white or black. If it is black, then the routine proceeds to decision block 146 where it is determined whether the first column pixel at the same INDEX location is black. If the first column pixel at the INDEX location is white, then the routine proceeds to decision block 148 where it is determined whether the pixel at the INDEX location of the third column is black. If the PIXEL at the INDEX location of the first column is black at block 146, then the routine proceeds to decision block 150 where it is determined if the pixel at the INDEX location of the third column is black. If it is black or if the decision at block 148 is negative, then the second column pixel at the INDEX location is set to white.

If the decision at decision block 148 is yes or if the decision at either decision block 144 or 150 is negative, then the routine proceeds to decision block 154 as shown. It is then determined whether subroutine A is complete at decision block 154, and if not, it proceeds to increment the INDEX by the OFFSET at block 156 and then again proceeds to block 144 as indicated in FIG. 13B. The routine is complete if all the columns of pixel data for that portion of the intaglio image or pattern being checked are processed.

If the decision at block 154 is yes, then the routine proceeds to block 134 (FIG. 13A) where the pixels are written or stored in memory (not shown) of computer 34. If the ink controller routine has processed all columns of data (decision block 136 in FIG. 13A), then the routine exits. The routine will be complete at block 136 (FIG. 13A) if it has gone through all columns of data for a given intaglio image or pattern being engraved, such as the letter "O" in FIG. 15A. If it is not complete, then the routine proceeds to block 138 where the toggle is toggled. The routine then proceeds to block 140 where the second column of pixel data becomes the first column and the third column becomes the second column and a new third column of pixels is read (block 132).

Once either the ink controller routine is exited or if it is determined that no ink controller is needed (decision block 102, FIG. 11), then the final intaglio engraving signal is generated at block 106 as mentioned above. The final intaglio engraving signal is then used by computer 34 to energize engraving head 26 in order to effect the engraving of the predetermined intaglio pattern on cylinder 12. The engraving process and method are then complete.

An illustration of the apparatus and method for engraving the predetermined intaglio pattern on the cylinder 12 for use in a printing press (not shown) for printing the predetermined intaglio pattern will now be described. First, the cylinder 12 is rotatably mounted on engraver 10 between headstock 16 and tailstock 18. Drivers 30 rotatably drive the cylinder and the engraving head carriage 22 in rise to signals received from computer 34. Computer 34 also energizes drivers 30 to cause engraving head 26 to move into a start position so as to begin engraving the predetermined intaglio pattern.

The intaglio engraving signal which generally corresponds to the predetermined intaglio pattern is generated in the manner described above. The computer 34 of engraver 10 then energizes the engraving head 26 to, in turn, cause the actuator arm 52 to oscillate towards and away from cylinder 12 in response to the intaglio engraving signal 38 corresponding to the predetermined intaglio pattern. As the actuator arm 52 and stylus 58 (FIG. 4) engage the surface of the cylinder 12, at least one intaglio trench is created. As mentioned earlier herein, it may be desirable to modify the intaglio engraving signal such that at least one ink flow controller or post 144 is provided in the intaglio pattern when it is engraved in which case the ink controller routine is initiated (blocks 102 and 104 in FIG. 11). It may also be desirable as indicated above to boost a portion or all of the source file image data.

As mentioned above, the source file image data (illustrated in FIG. 15B) is stored in memory in computer 34, or inputted into computer 34, for example, by an independent input terminal or work station (not shown). The source file image data is analyzed as described earlier herein and an engraving resolution is determined (block 90 in FIG. 11). The source file image data is again modified or thresholded as described above and a preliminary intaglio engraving signal is generated (block 94 in FIG. 11). An intaglio pattern, such as the engraved "O" in FIG. 15C may then be engraved in response to the intaglio engraving signal.

After the cylinder 12 has been rotatably mounted in engraver 10, the intaglio process may begin. One or more predetermined intaglio patterns or grooves of such patterns which include one or more intaglio characters are then engraved on the surface 13 of cylinder 12. When engraving is complete, the cylinder 12 may be removed from the engraver 10.

The cylinder 12 may then be rotatably mounted in a printing press (not shown). A web of material, such as paper, plastic or the like, may then be fed through the printing press and the predetermined patterns may be printed on the web.

Advantageously, this method and apparatus facilitates engraving predetermined intaglio patterns having continuous grooves or trenches on cylinders, while the cylinders are rotated. It should be appreciated that this intaglio engraving could be utilized with cylindrical type engravers or helical type engravers, for example, of the type that were traditionally used in gravure engraving. Also, the features of this invention may be used with other types of engraving such as laser engraving.

Further, this apparatus and method facilitate engraving or even embossing intaglio patterns or images on a cylinder which can be engraved at speeds comparable or better than conventional gravure engravers. Also, the intaglio engraving can be performed much quicker than, for example, manual engraving of plates. Intaglio engraving in accordance with this method and apparatus is also more accurate when compared to engraving systems and methods of the past.

Finally, this invention facilitates using a substantially or completely continuous square engraving signal which was not heretofore used in engravers which engraved intaglio patterns on cylinders for use in printing presses.

While the method herein described, and the form of apparatus for carrying this method into effect, constitute preferred embodiments of this invention, it is to be understood that the invention is not limited to this precise method and form of apparatus. For example, it should be appreciated that the apparatus and method described herein may be used in conjunction with conventional gravure engraving such that a pattern of intaglio trenches engraved in accordance with this method and apparatus may be engraved or configured alone or in combination with gravure cells of the type used in the past. Thus changes may be made in either without departing from the scope of the invention, which is defined in the appended claims.

What is claimed is:

1. An intaglio engraved pattern for a cylinder for printing an intaglio pattern comprising:
   a plurality of engraved areas engraved by rotating a cylinder while causing a stylus on an engraving head to cut into a surface of the cylinder to define said intaglio engraved pattern;
   said plurality of engraved areas each defining an engraved area having a bottom that is generally planar; and
   said plurality of engraved areas are in fluid communication to define a large engraved area.

2. The intaglio engraved pattern as recited in claim 1 wherein said ink controller comprises a post situated in said intaglio pattern.

3. The intaglio engraved pattern as recited in claim 2 wherein a top portion of said post is situated below a surface of said cylinder.

4. The intaglio engraved pattern as recited in claim 1 wherein said plurality of engraved areas define a single intaglio character in said intaglio pattern.

5. The intaglio engraved pattern as recited in claim 1 wherein said plurality of engraved areas define a single intaglio character in said intaglio pattern.

6. The intaglio engraved pattern as recited in claim 1 wherein a plurality of engraved gravure cells are situated in or near said pattern.

7. A method for engraving an intaglio engraved pattern on a cylinder for printing an intaglio pattern comprising:

provide an engraver for engraving a plurality of engraved areas engraved to define said intaglio engraved pattern;

said plurality of engraved areas each defining an engraved area having a bottom that is generally planar; and engraving said plurality of engraved areas in fluid communication with each other to define a large engraved area.

8. The method for engraving as recited in claim 7 wherein said ink controller comprises a post situated in said intaglio pattern.

9. The method for engraving as recited in claim 8 wherein a top portion of said post is situated below a surface of said cylinder.

10. The method for engraving as recited in claim 7 wherein said method comprises engraving said plurality of engraved areas to define a single intaglio character in said intaglio pattern.

11. The intaglio engraved pattern as recited in claim 7 wherein said method comprises engraving said plurality of engraved areas to define a single intaglio character in said intaglio pattern.

12. The intaglio engraved pattern as recited in claim 7 wherein said method comprises engraving a plurality of engraved gravure cells in or near said intaglio engraved pattern.

13. The intaglio engraved pattern as recited in claim 7 wherein said method comprises using an electro-mechanical gravure engraver to perform said engraving step.

14. A method for engraving an intaglio engraved pattern on a cylinder for printing an intaglio pattern comprising:

providing an engraver for engraving a plurality of engraved areas engraved to define said intaglio engraved pattern;

said plurality of engraved areas each defining an engraved area having a bottom that is generally planar; and at least one of said plurality of engraved areas comprising at least one ink controller for controlling ink.

15. The method for engraving as recited in claim 14 wherein said ink controller comprises a post situated in said intaglio pattern.

16. The method for engraving as recited in claim 14 wherein a top portion of said post is situated below a surface of said cylinder.

17. The method for engraving as recited in claim 14 wherein said method comprises engraving said plurality of engraved areas to define a single intaglio character in said intaglio pattern.

18. The intaglio engraved pattern as recited in claim 14 wherein said method comprises engraving said plurality of engraved areas to define a single intaglio character in said intaglio pattern.

19. The intaglio engraved pattern as recited in claim 14 wherein said method comprises engraving a plurality of engraved gravure cells in or near said intaglio engraved pattern.

20. The intaglio engraved pattern as recited in claim 14 wherein said method comprises using an electro-mechanical gravure engraver to perform said engraving step.

* * * * *